3,162,222
CUTTER HEAD FOR CYLINDER TYPE FLAKERS
Paul Arthur Kirsten, Bonner Talweg 26, Bonn, Germany
Filed Sept. 8, 1959, Ser. No. 838,672
7 Claims. (Cl. 144—172)

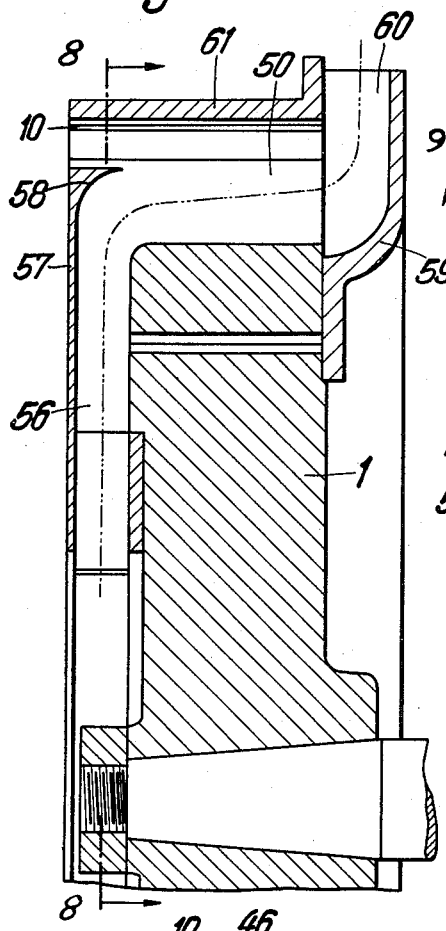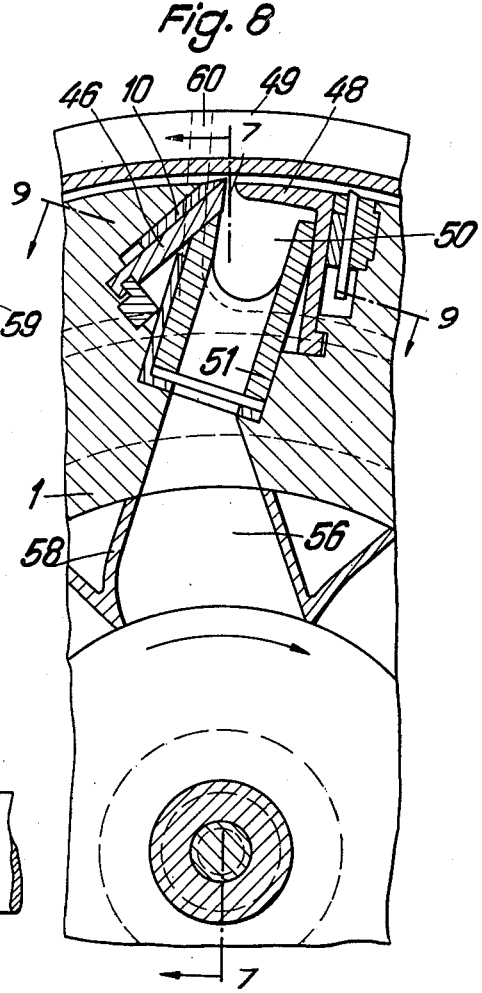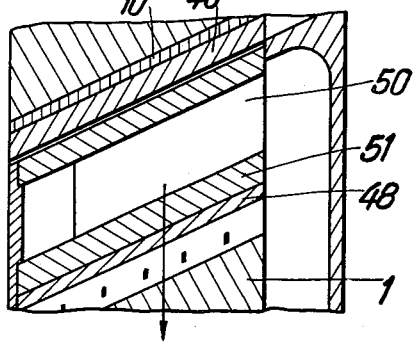

This invention is directed to the production of high grade flakes from wood, and more particularly to the production of such flakes by an economically operating cylinder-type flaker.

In general, disc-type flaking machines have been able to produce good wood flakes with smooth surfaces for good bonding action on the part of the resin, having less internal cleavage, of equal thickness, and having component fibers parallel to the surfaces, thus contributing greater strength to the board with significant savings in resin content. These desirable flake attributes have been realized with disc-type flakers because the flakes are carried away from the edge of the cutting knife through the disc, and further because the extension of the knife cutting edge beyond the periphery of the cutter is not altered by screw tightening forces and centrifugal forces as the knives travel in a plane. However, such disc-flakers require the wood to be cross-cut to a special maximum length in order to fit into the feed mechanism. The disc-type flaker requires too much labor and necessitates the installation of a cross-cut saw. The disc-type flakers, as well as cylinder-type flakers of the type previously known, also have the disadvantage that when the wood is initially presented to the cutting edge, it is not clamped tightly enough to prevent movement of the wood as the cutting action commences or to prevent vibration as the cutting action continues.

Cylinder-type flakers previously known have not been able to produce flakes with the desirable attributes described above. The flakes produced are pressed into a groove in front of the knife; many of the flakes are damaged or destroyed as they are thrown out prematurely from the groove by centrifugal forces and strike the edge of the knife. The protrusion or extension of the knife's cutting edge beyond the periphery of the rotor body in previously known cylinder-type flakers is influenced by unequal screw-tightening forces, by knife thickness tolerances, and by tolerances of the other components such as the wedge-shaped pressure bars for tightening or securing the knives. Moreover, whenever the wood material being cut is flexible, it is easily pulled into the groove in front of the knife by a component of the cutting force with the result that flakes of excessive thickness and many splinters are produced.

The present invention eliminates the described deficiencies and undesirable characteristics of prior art devices.

The novel cylinder-type flaker of the present invention includes a cutter head which is displayed with respect to a cutting zone at the end of a charging channel along which the wood is directed for engagement with the knives of the cutter head in the cutting zone. In a preferred embodiment as disclosed and claimed herein, the invention may comprise two separate charging channels, each of which terminates in a cutting zone disposed radially of the axis of the cutter head. When the cutter head has completed the flaking operation in one of the two zones, the second zone is open and wood is directed into the second zone from the adjacent charging channel. The cutter head is then reciprocated along an operating axis which is perpendicular to the axis of rotation, and the cutting knives gradually flake or cut the wood positioned in the second cutting zone. As the cutter head reaches its extreme position along the operating axis, the first cutting zone is open to receive wood from its respective charging channel. Thus the next reciprocation of the cutter head along the operating axis is effective to flake the wood placed in the first cutting zone and again open the second zone for recharging. During the entire flaking operation, both with initial engagement of the cutting knives and the wood as the cutter head is reciprocated into one or the other cutting zone, and during the subsequent total flaking of the wood positioned in such zone, the wood so positioned is firmly clamped and restrained against vibration so that it is presented to the cutting edges of the knives in a fixed position and maintained in that position during the flaking operation. Thus good flakes are obtained and less waste, such as dust, etc. is encountered, and the edges of the knives are also preserved.

The cutter head slices across the end of the clamped wood or pile of wood material such as logs, slats, edgings, veneer waste, veneer cores, etc., without cross-cut; the material can be any length. The actual cutting is effected by the reciprocation of the cutter head with respect to the wood in the cutting zones; therefore the output of the novel apparatus is high. It is emphasized, however, that the principles of the invention can be utilized with only a single charging channel and a single cutting zone adjacent the cutter head. It is also noted that although in the illustrated embodiment the cutter head is described as being reciprocated with respect to the fixed cutting zones and charging channels, it is also possible to maintain the cutter head rotating about a stationary axis and reciprocate the charging channels to effect the flaking operation.

While the cutter head is reciprocated back and forth along its operating axis between the cutting zones at the extremities of the two charging channels in the illustrated embodiment, the direction of rotation of the cutter head remains constant; accordingly the cutting forces of the knives are directed downwardly in one cutting zone (at the end of charging channel 7 in the illustrated embodiment), and the cutting forces are in the upward direction in the other cutting zone (end of channel 6). In accordance with a feature of the invention, the wood being cut is so clamped in each of the cutting zones that the clamping forces are in proper directions to augment the cutting forces, whether the cutting forces are in the upward or downward direction, thereby firmly securing the wood during the flaking operation. The resultant holding or clamping force obviates vibration of the wood during the flaking operation.

Each charging channel includes both a fixed guide plate or reference wall member and a movable or floating guide wall positioned opposite the fixed guide plate. The fixed guide plate of each channel has a surface which lies in the same plane as a corresponding surface of a wood-supporting table in the cutting zone at the end of the charging channel. A clamping lever urges the wood material against the wood-supporting table. Both the clamping lever and the table are maintained in the same positions with respect to the cutter head as the head is reciprocated in the flaking operation. In the illustrated embodiment, the charging channels are fixed in position and the cutter head is displaced to effect the flaking operation; accordingly the wood-supporting table and the clamping lever are simultaneously displaced, to maintain the same positions relative to the cutter head. In the right cutting zone (at the end of channel 7), the wood-supporting table is positioned below and the clamping lever or device above the wood, so that the clamping forces are added to the cutting forces as the knives flake off the wood. Conversely, in the left cutting zone (end of charging channel 6), the wood-supporting table is positioned above and the clamping lever below the wood, so that the clamping forces are added to the cutting forces provided by the cutting knives.

To obviate damage to the flakes as they are produced, the cutter head of applicant's invention is provided with a slit in front of each knife cutting edge, which slit is the entrance aperture for a flake-collecting space. The flakes pass the slit and enter the flake-collecting space because of the reaction to the cutting forces at the knife edges, and the flakes are subsequently ejected from the collecting spaces by centrifugal forces developed as the cutter head rotates.

Further, it is advantageous to make the entrance slit as narrow as possible to provide stable support for the wood being cut and to produce flakes of uniform thickness. When the entrance slit adjacent the knife is made very narrow it acts as a sifter and rejects splinters, chunks, and waste material larger than the flake size and prevents the mixing of such undesirable scrap with the flakes. When the slit is narrow, some of the flakes may not be ejected by the centrifugal forces. Accordingly it may be desirable to augment the centrifugal forces by the application of fluid under pressure, such as compressed air, to eject the flakes through the narrow slits. In accordance with this feature of the invention, the fluid under pressure is not applied to the flake-collecting space until after the space has passed through the cutting zone and is so positioned that the flakes are ejected into a delivery duct or chute.

Another aspect of the invention includes the provision of an angle iron positively connected with the body of the cutter head. The lip or cant at the extremity of the angle iron and the edge of the cutting knife define the slit or entry into the flake-collecting space. The transverse portion of the angle iron provides a good support in front of the knife for the wood to be cut, and limits the thickness of the flakes. Accordingly flakes of equal thickness are produced because unequal screw tightening forces, tolerance variations in the knife thicknesses, and other tolerances do not influence the angle iron construction.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

Figure 1:
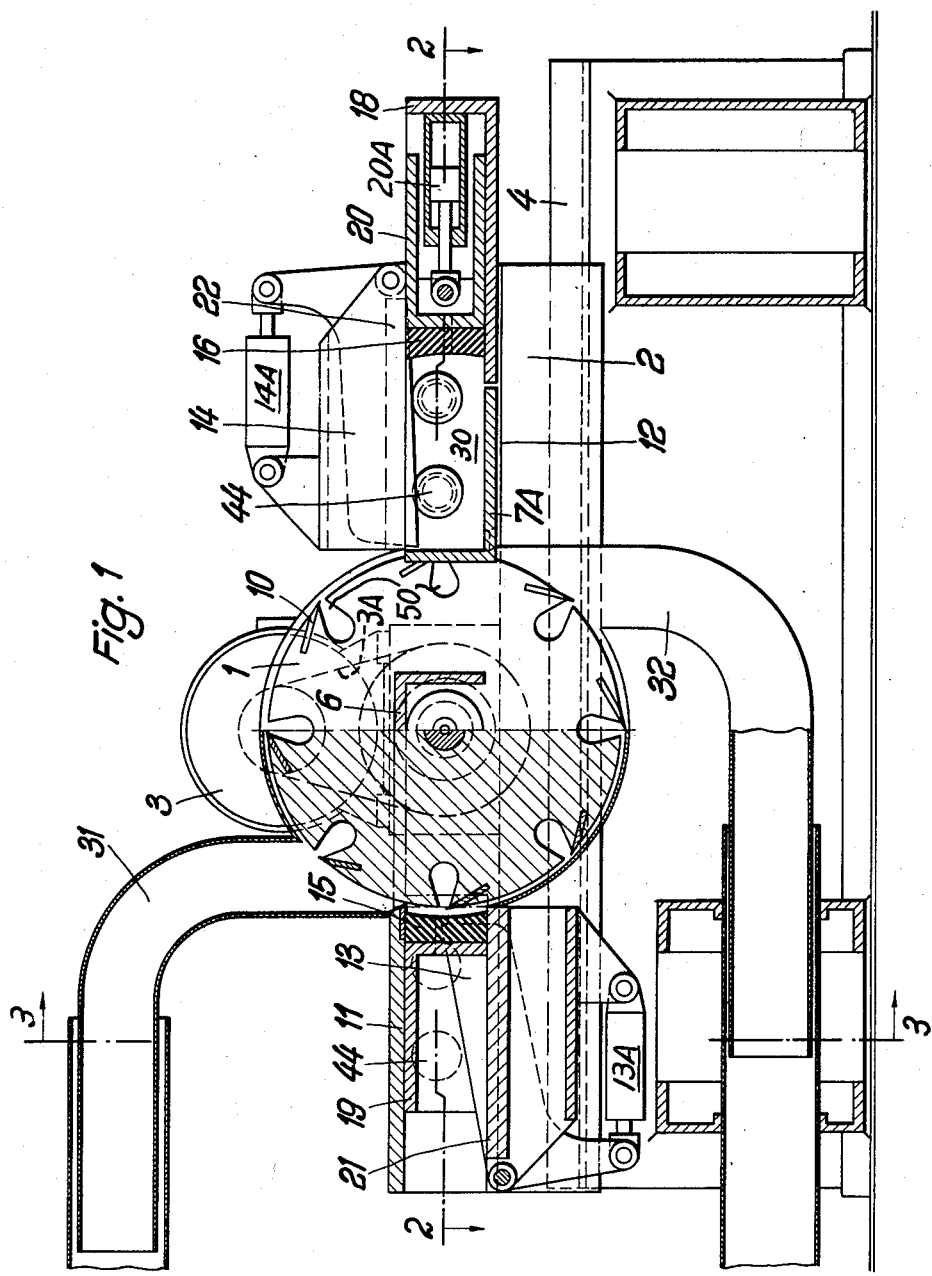
FIGURE 1 is a front view, partly in section, taken along the line 1—1 of FIGURE 2.
Figure 6:
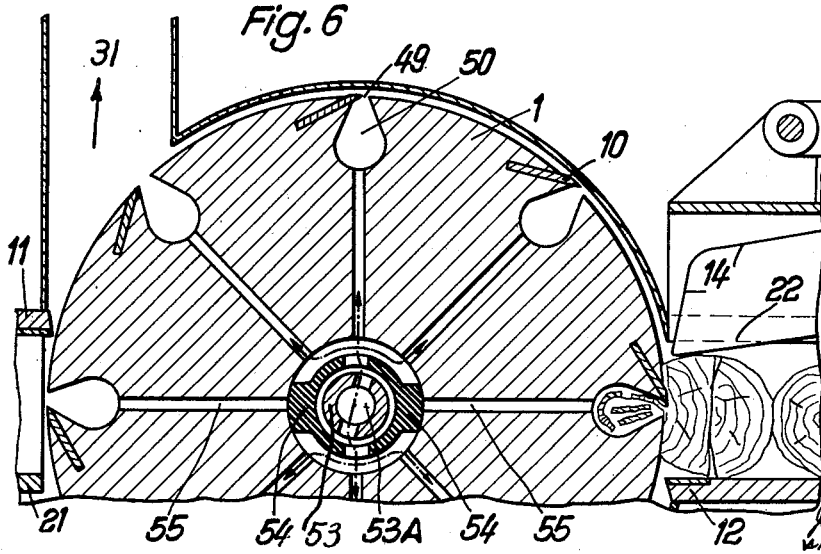

FIGURE 6 is a sectional view taken on an enlarged scale of a portion of the cutter head shown in FIGURE 1, illustrating the utilization of a fluid under pressure to augment the centrifugal forces in ejecting flakes from the flake-collecting spaces; and FIGURES 7–9 are side, front and plan views, respectively, all taken in section, interrelated as designated by the various section lines and their reference numerals, depicting an embodiment of the invention in which fan principles are utilized in the collection and ejection of the flakes.

Figure 2:
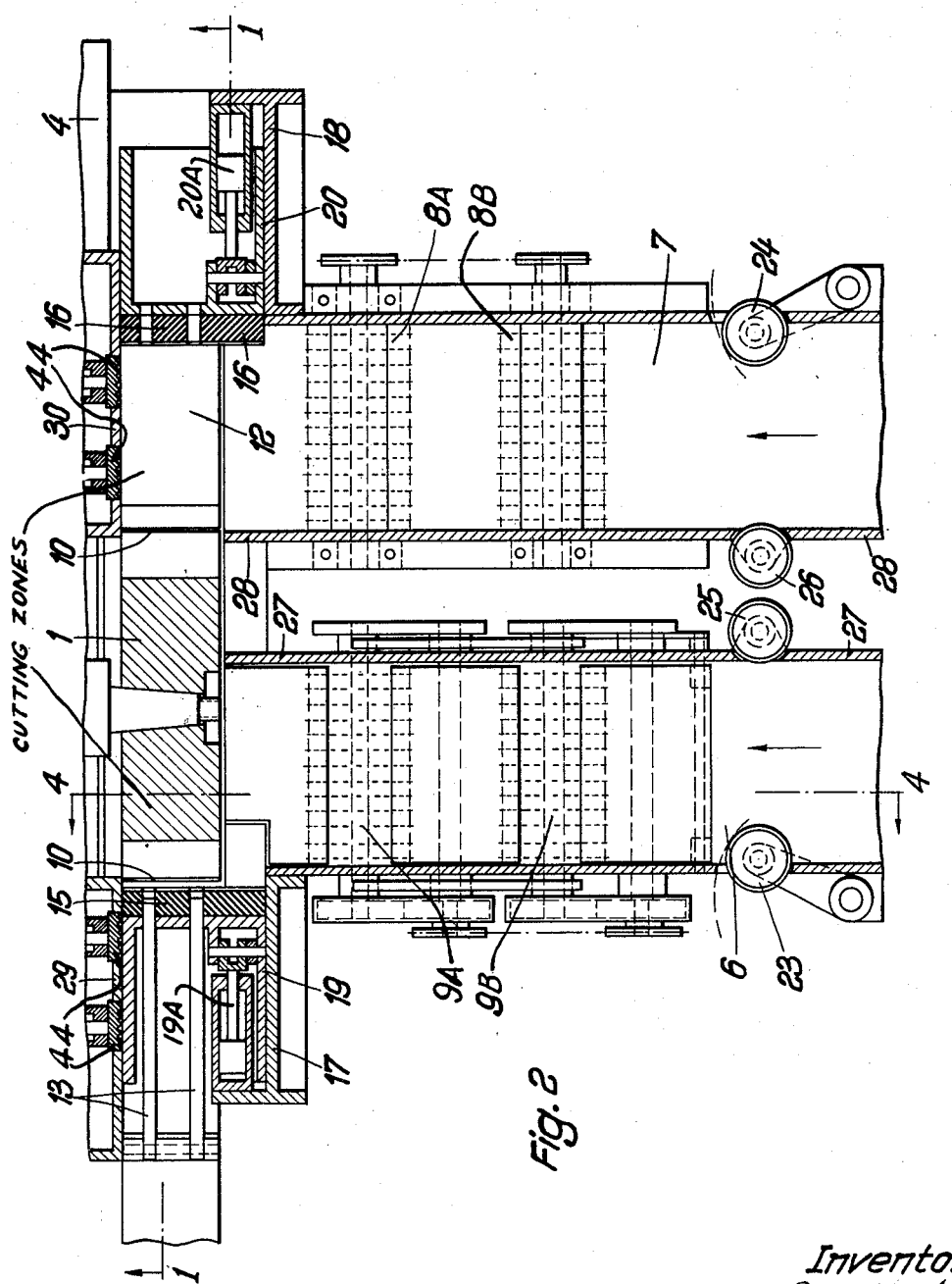
FIGURE 2 is a plan sectional view, taken along the line 2—2 of FIGURE 1.

Before considering the structure and operation of the invention, attention is directed to FIGURE 2. As will be explained more fully hereinafter, the wood to be flaked is passed by movement of spiked rollers 8A, 8B, 9A and 9B along the charging channels 6 and 7 in the direction shown by the arrows until the wood is positioned in one of the cutting zones at the ends of the channels adjacent the cutter head. As shown in FIGURE 2, cutter head 1 is in its left end position in which it occupies the left cutting zone at the end of channel 6, leaving the right cutting zone at the end of charging channel 7 open to receive wood therefrom. Accordingly, holding plates 44 are displaced from the position illustrated in FIGURE 2 toward the opposite side of the right cutting zone to engage and support the wood entering from channel 7, the force of the wood returning the holding plates to their recessed position as the rollers drive the wood against end plate 30. Abutment bar 16 is then displaced transversely of the wood to force the wood against the side wall or plate 28 of channel 7 and position the wood properly for cutting. A clamping lever 14 (FIGURE 1) is then actuated to press downwardly on the wood in the cutting zone and force the wood against wood-supporting table 12 (FIGURE 2). Cutter head 1 is then reciprocated to the right along its operating axis while the wood-supporting table and the clamping lever are displaced in accordance with the movement of the cutter head to avoid engagement with the cutting knives. Accordingly, as the cutter head is displaced from its left end to its right end position to occupy the right cutting zone, the left cutting zone at the end of charging channel 6 is opened and an analogous process now occurs. Wood supporting table 11 (FIGURE 1), clamping lever 13 (FIGURE 2), and the other elements illustrated to the left of the cutter head in FIGURE 2, have been displaced into alignment with charging channel 6 to receive and secure the wood during the next flaking operation.

It is evident that only one charging channel can be utilized if desired, and that the conveyor system of the channels can be extended to any length to feed the wood toward the cutting zones. Further, instead of maintaining the charging channels stationary, the channel equipment and the abutment bars 15 and 16 can be reciprocated while the other elements including cutter head 1, wood-supporting tables 11 and 12, and two-armed clamping levers 13 and 14 are maintained in fixed positions. All that is required is relative displacement of the cutter head with respect to the wood in the cutting zones, while the positions of the wood-supporting tables and the clamping levers are maintained constant with respect to the cutter head to avoid engagement with the cutting edges of the knives.

*Structural Description of Cutter Head and Charging Channel Arrangement*

In the embodiment of the invention shown in FIGURE 1 the cutter head 1 is shown in its left end position, wherein it occupies the left cutting zone and the right cutting zone is open to receive wood delivered along channel 7. Wood flakes produced in the left cutting zone enter the flake-collecting spaces 50, and are ejected therefrom into exit duct 31, whence they are delivered by any suitable means to a collecting station. Similarly, wood flakes produced in the right cutting zone are ejected into the exit duct 32, and are likewise delivered to a collecting station. The power for cutter head rotation is obtained from motor 3 over a flexible drive means 3A in an obvious manner.

Slide 2 is mounted for reciprocation back and forth along the bed or frame 4. The slide supports the cutter head and motor assembly, and also (at the right cutting zone) carries a wood-supporting table 12 and a two-armed clamping lever 14; accordingly table 12 and lever 14 are displaced with the cutter head. The two-armed clamping lever 14 is connected for displacement by a pneumatic actuator 14A to effect engagement of the lever arms against the upper portion of the wood position in the right cutting zone over wood-supporting table 12. An abutment bar 16 is connected to an associated slide member 20, in turn connected to a pneumatic actuator 20A for displacement along guide member 18. Guide member 18 is affixed to a wall of channel 7, adjacent the right cutting zone. The abutment bar includes a pair of spaced-apart slots (FIGURE 2) as does slide 20, for receiving the two arms of lever 14.

Figure 3:
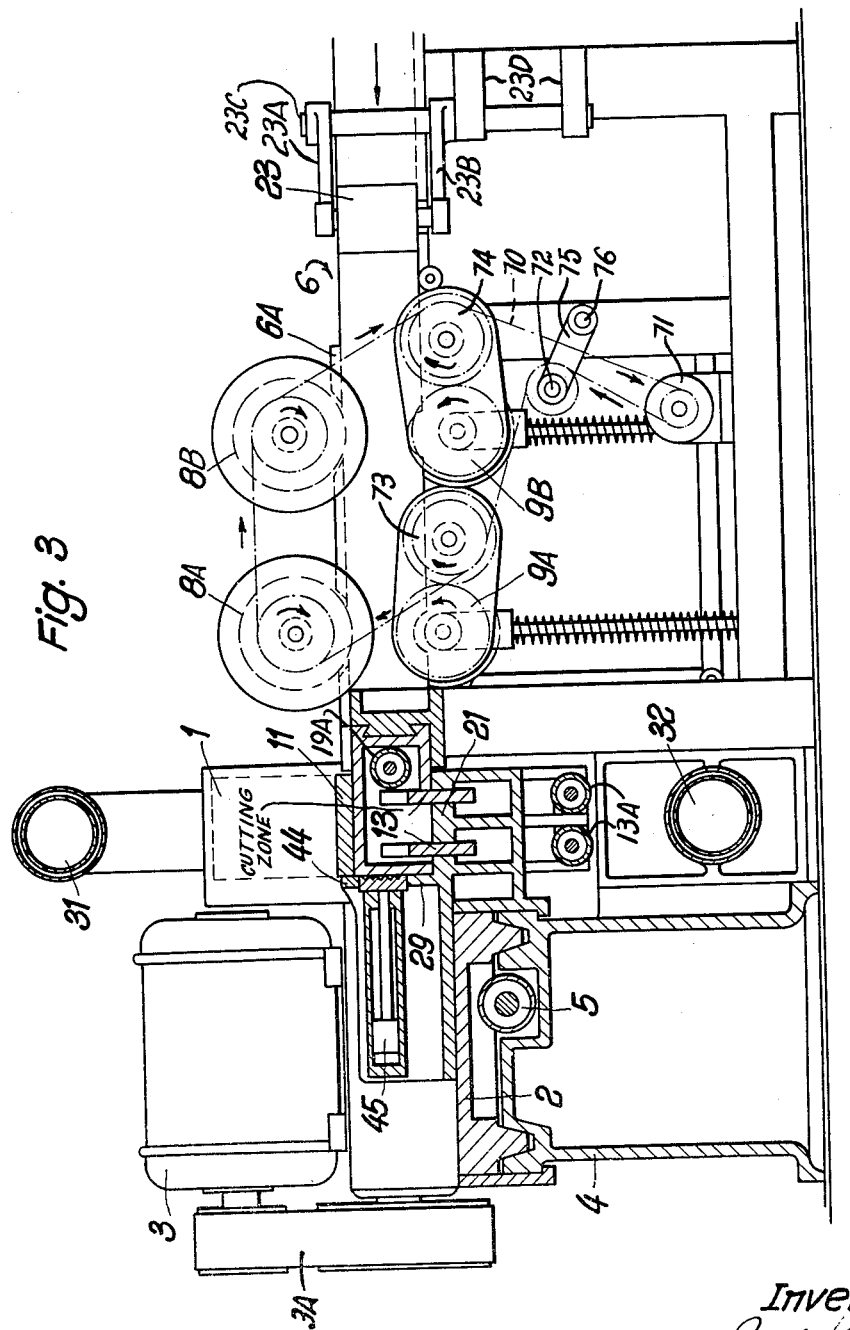
FIGURE 3 is a side view, partly in section, taken along the line 3—3 of FIGURE 1.

A pair of holding plates 44 are positioned within recesses of end plates 30 at the rear of the cutting zone. As shown in FIGURE 3, the holding plates can be driven outwardly by a pneumatic actuator 45 to engage the wood as it enters the cutting zone from charging channel 7, to prevent tilting or slanted presentation of wood remainders to the cutting knives. The holding plates 44 are returned to their recessed positions by the wood, and actuator 45 can be utilized to insure that plates 44 are withdrawn beyond the face of end plate 30 as the cutting action commences, to avoid engagement with the cutting knives. Guide plate 22 (FIGURE 1), positioned above the right cutting zone, has a pair of linear passages (not shown) positioned in alignment with the slots in abutment bar 16 for permitting the downward passage of the two arms of clamping lever 14 as they engage the wood in the right cutting zone.

In a related but inverted fashion (as shown to the left of cutter head 1), wood-supporting table 11 at the end of charging channel 6 is positioned above the two-armed clamping lever 13 which clamps the wood as it is displaced into the left cutting zone (the cutter head having first been displaced from its illustrated position to its right end position, thereby opening the left cutting zone). The utilization of wood-supporting table 11, two-armed clamping lever 13 and its associated pneumatic actuator 13A, abutment bar 15, guide member 17 (FIGURE 2), slide 19 (FIGURE 1), and guide plate 21 are all similar to the related components already described in connection with the right cutting zone.

Figure 4:
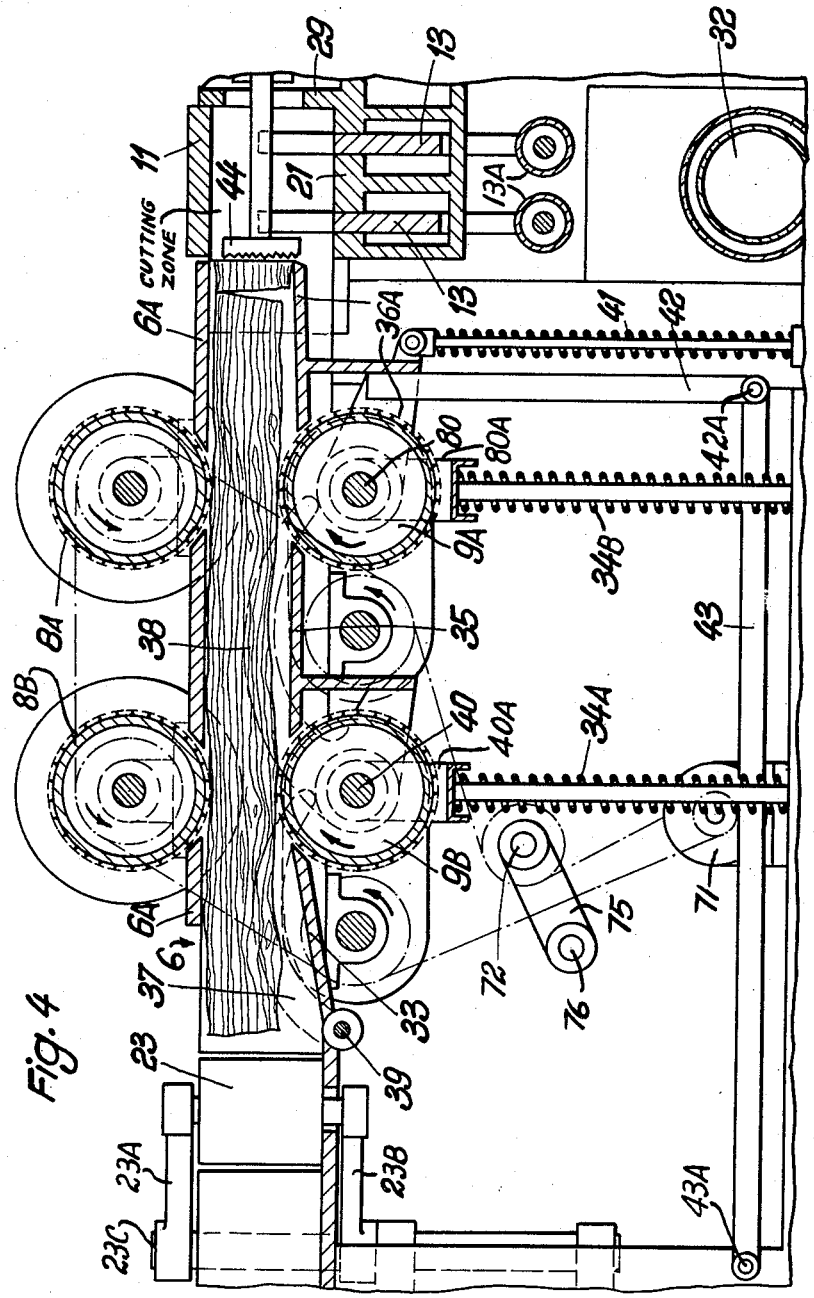
FIGURE 4 is a side view on an enlarged scale taken along the line 4—4 of FIGURE 2 and looking in a direction opposite the showing of FIGURE 3.

In FIGURE 2 the right and left cutting zones are also shown; end plates 29 is positioned to define the back wall of the left cutting zone when displaced into longitudinal alignment with channel 6. At the other end of this channel a roller 23 is mounted on support arms and biased in a well known manner to displace the wood entering the charging channel toward the opposite wall 27, in which a roller 25 having a fixed axis of rotation is positioned. A pair of spiked rollers 9A and 9B are indicated at the bottom of the channel (the section is taken at the center of the flaker, as shown in FIGURE 1); upper rollers 8A and 8B are depicted in FIGURES 3 and 4. The charging channel defines a path for routing or directing the wood material to be flaked longitudinally from the entrance of the charging channel toward the cutting zone, for eventual flaking as the cutter head is reciprocated.

The two arms of clamping lever 13 are illustrated in FIGURE 2. The arms are initially disposed below the lowest part of charging channel 6, so that as the cutter head and other elements of the mechanism are displaced from the left end position as shown in FIGURE 2 to the right end position, the clamping device 13 can be actuated upwardly to clamp the wood in the left cutting zone against wood-supporting table 11 (FIGURE 1).

The mechanism of the right charging channel 7 is similar to that of channel 6.

In FIGURE 3 the utilization of flexible drive means 3A between the shaft of motor 3 and the driving shaft of cutter head 1 is illustrated. Other means for providing driving power for the cutter head and applying that power to the cutter head shaft will no doubt be suggested to those skilled in the art. This view also illustrates the provision of wedge-like extensions on slide 2 which are received in the guide-ways of the bed or frame member 4, for displacement of the motor, cutter head, wood-supporting tables, clamping means and associated elements along an operating axis with actuation of the pneumatic operating means 5.

Also shown in FIGURE 3 is a flexible drive means 70 which transfers rotational power for rotating the spiked rollers 8A, 8B, 9A and 9B to pass the wood along the charging channel toward the cutting zone. That is, flexible belt 70 is threaded over a drive wheel 71, over a clamping pulley 72, over driven wheel 73 which is disposed to drive spiked roller 9A, over reduced-diameter portions of spiked rollers 8A and 8B, and over driven wheel 74 which is positioned contiguous to roller 9B for effecting rotation thereof. Clamping pulley 72 is supported by levers 75 (only one of which is shown); the opposite ends of levers 75 are journalled on shaft 76. Accordingly, when drive wheel 71 is driven by suitable means (not shown) in the clockwise direction, the flexible belt 70 is also driven in the clockwise direction as shown by the arrows. Each of driven wheels 73 and 74, and spiked rollers 8A and 8B, are also rotated in the clockwise direction. Spiked rollers 9A and 9B, being coupled respectively to driven wheels 73 and 74, are thus rotated in the opposite sense or in the counter-clockwise direction. Accordingly the rotation of rollers 8A–9B, which engage the wood as it is passed along the charging channel, is in the proper direction to transfer the wood from the entrance of the charging channel to the cutting zone.

Also shown at the right side of FIGURE 3 is pivoted roller 23, supported by arms 23A and 23B journalled on a shaft 23C. The shaft extends through supports 23D affixed to frame member 4. Thus the roller 23 is pivoted for displacement under the urging of a bias spring (not shown) or other means to maintain the wood entering the charging channel in proper alignment as explained above.

Referring now to FIGURE 4, because this view is taken in a direction opposite that of FIGURE 3, the various elements and their directions of movement in FIGURE 4 are reversed with respect to the illustration of FIGURE 3. FIGURE 4 depicts the "floating guide wall" or floating bottom of charging channel 6, which is biased upwardly from the bottom of the channel toward a fixed guide plate 6A which defines the top of the channel, thus to accommodate wood of varying thickness as it is directed through the channel toward the left cutting zone. Specifically, the floating guide wall comprises a climbing plate 33, a portion of the periphery of spiked roller 9B, a middle plate 35, a portion of the periphery of spiked roller 9A, and pressure plate 36 disposed between roller 9A and the cutting zone at the end of channel 6. Climbing plate 33 provides a ramp-like entrance for the wood to effect its upward displacement from the bottom of the charging channel as the wood is urged against fixed guide plate 6A. The climbing plate 33 is pivoted about a shaft or pivot point 39, and a lever 37 is connected to the climbing plate at such pivot point. The other end of lever 37 engages a reduced-diameter portion of spiked roller 9B. Accordingly the angle of inclination of climbing plate 33 is regulated by engagement of the end of lever 37 with roller 9B, transverse displacement of the roller as it engages the wood effecting a simultaneous change in the angle of inclination. This construction permits the pivoting of plate 33 in a counterclockwise direction to open the charging channel for maintenance operations.

Spiked roller 9B is journalled about a first reference axis or shaft 40, which in turn is affixed to a support plate 40A positioned above bias spring 34A; spring 34A urges support plate 40A and spiked roller 9B upwardly to engage the lower portion of the wood in the charging channel.

The displacement of middle or center plate 35 is a function of the transverse displacement of both spiked roller 9B and spiked roller 9A. That is, middle plate 35 is affixed at its lowermost portion to one arm of a two-armed lever 38, which lever is journalled about the first reference axis (shaft 40). The other arm of lever 38 extends toward and contacts a reduced-diameter portion of spiked roller 9A, itself journalled about a second reference axis (shaft 80). Shaft 80 is carried on support plate 80A, which is biased upwardly by the force of spring 34B. Thus, as rollers 9A and 9B are displaced transversely of the channel, the extremity of the longer arm of lever 38 is a function of the position of roller 9A, and as roller 9B is displaced, the pivot axis of two-armed lever 38 is similarly displaced. Accordingly, middle plate 35 is always displaced so that its uppermost portion is generally parallel to a line drawn tangent to the uppermost portions of spiked rollers 9B and 9A.

Also pivoted about shaft 80 is a lever 36A, the opposite end of which is connected to the lower extremity of pressure plate 36; thus the pressure plate is pivoted about the second reference axis and remains close to the circumference of roller 9A. The lower extremity of pressure plate 36 is also biased upwardly by spring 41, which can be replaced by a pneumatic actuator if desired. To maintain the right edge of pressure plate 36 in proper alignment with the cutting zone as shown in FIGURE 4, pressure plate 36 is also affixed to guide rod 42, pivoted at connection 42A to a second guide rod 43, which in turn is pivotally connected at 43A to the supporting frame.

Although not described, the elements of channel 7 are similar to those of channel 6 illustrated and described in connection with FIGURES 3 and 4. The principal difference is that the vertical positions of spiked rollers 8A, 8B, 9A and 9B are inverted, so that the floating guide wall of charging channel 7 is at its top, and fixed guide plate 7A is at the bottom of the channel (FIGURE 1). This is in accordance with the inventive teaching, whereby the clamping force at the cutting zone is added to the cutting forces as the knife edges are rotated through the wood.

*Operating Description of Cutter Head and Charging Channel Arrangement*

Considering now the operation of the invention, as illustrated in FIGURES 1–4, and referring particularly to FIGURE 2, cutter head 1 is shown in its left end position wherein it occupies the left cutting zone; thus the right cutting zone over wood-supporting table 12 at the end of charging channel 7 is open. Accordingly wood positioned at the entrance of charging channel 7, is displaced against the side wall 28 by the action of roller 24, and passed by rotation of spiked rollers 8A–9B toward and into the right cutting zone. Holding plates 44 are initially positioned to extend into the zone, and are displaced toward end plate 30 as the wood enters the cutting zone and eventually seated flush with or recessed slightly behind the end plate as shown in FIGURE 2. Accordingly wood is positioned against end plate 30 in the right cutting zone.

Abutment bar 16 and slide 20 are now moved by actuation of pneumatic operator 20A so that abutment bar 16 pushes the wood toward side wall 28, into the proper position for engagement by the cutting knives as the cutter head is rotated. Thus the longitudinal displacement of the wood is referenced by end plate 30, and its transverse position is regulated by the displacement of actuator 20A and abutment bar 16. In the vertical direction, the wood is positioned over wood-supporting table 12 and clamped thereat by the downward movement of double-armed clamping member 14 responsive to movement of pneumatic actuator 14A (FIGURE 1). Accordingly the wood has been placed in the charging channel, displaced along the channel into the right cutting zone, and has been clamped securely in the three dimensions to await the flaking action as the cutter head is reciprocated along its operating axis.

Referring to FIGURE 3, cutter head 1 and its motor 3 are now displaced along the guide ways in the bed or frame 4 by the operation of pneumatic actuator 5, so that cutter head 1 is moved to the right as shown in FIGURE 2 to enter the right cutting zone and flake away the wood presented thereat. Supporting table 12 and double-armed clamping member 14 are carried on slide 2, and thus they are similarly displaced to avoid contact with the cutting knives. That is, the positions of the wood-supporting table and the double-armed clamping member are maintained unchanged relative to the cutter head as slide 2 is moved along bed 4. Thus, after the cutter head is reciprocated from the illustrated position to its right end position to occupy the right cutting zone at the end of charging channel 7, the left cutting zone is open to receive wood passed along charging channel 6 in exactly the same manner as was described with respect to charging channel 7. A limit switch can be provided in a well known manner to reverse the direction of travel of cutter head 1 along its operating axis before the cutting knives can engage the abutment bar.

The complete charging and flaking cycle with respect to the left cutting zone now takes place. That is, the wood is passed along from the entrance of charging channel 6, is displaced by movable roller 23 against side wall 27, and passed over the spiked rollers to enter the left cutting zone. The wood forces holding plates 44 from an extended position into a position flush with or slightly recessed behind end plate 29. It is noted that end plate 29, together with the other actuating elements shown in the upper left portion of FIGURE 2, will be displaced to the right as the cutter head is displaced from its left end to its right end position. Accordingly the longitudinal travel of the wood entering the left cutting zone is stopped by end plate 29, and pneumatic actuator 19A is operated to displace slide 19 and abutment bar 15 against the wood to move it toward side wall 27 and clamp the wood in the transverse direction. Because of the sectional presentation, the wood-supporting table 11 at the uppermost portion of the left cutting zone is not evident in FIGURE 2, but this table provides a reference surface for the wood and the double-armed clamping lever 13 is displaced upwardly to move the bottom of the wood up against this reference supporting table prior to reciprocation of the cutter head. Having properly positioned the wood in the left cutting zone, the cutter head is now reciprocated along the operating axis from its right end to its left end position to gradually shave off or flake the wood particles from the wood thus presented, and the cutter head again occupies the position shown in FIGURES 1 and 2. During this reciprocation the wood-supporting table 11 and double-armed clamping lever 13 are also displaced in relation to the cutter head displacement. Thus one complete cycle of the inventive system is accomplished.

*Knife Assemblies and Flake-Collecting Spaces*

Before considering the actual structure of the cutter head and the flake-collecting spaces therein, the desirable flake sizes for the wood particle board industry will be reviewed. Specifically, such flakes preferably have a length of from 10 to 40 millimeters (mm.) in the direction of the wood fiber; the exact length depends on the kind of particle board desired. With respect to thickness, the cutting knives can be set to cut wood flakes of from 0.15 to 0.80 mm., again depending on the type of board desired. To obtain such flakes, the wood is preferably positioned in the charging channel as described above, parallel to the axis of rotation of the cutter head.

Figure 5:
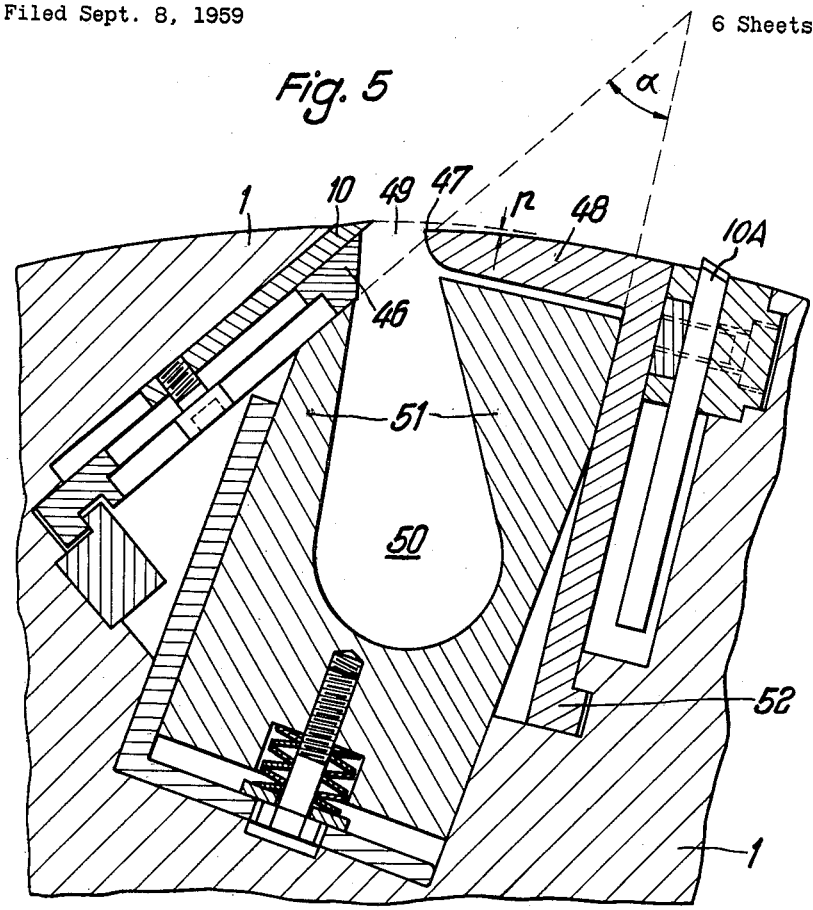
FIGURE 5 is a partial sectional view of one segment of the cutter head, showing the flake-collecting space, and the cutting knife and angle iron defining the entrance aperture for such space.

To produce flakes of uniform thickness, it is necessary to pre-set the radial displacement between the edge of cutting knife 10 and the periphery of cutter head 1, which displacement is referenced by the letter "$p$" in FIGURE 5. "Radial", as used herein, refers to a straight line in substantially the same direction as a radius of the cutter head. Thus it is essential to provide means for fixing the cutting knives 10 in the illustrated position, so that such position will not be changed by the application of centrifugal forces during operation of the machine. Such means are disclosed and claimed in applicant's copending application entitled 'Rotary Tool for Woodworking and Woodcutting Machines", Serial No. 798,946, filed March 12, 1959, now Patent No. 3,014,511. Reference to this copending application may be had for instruction as to the construction and insertion of the cutting knife assemblies, as well as the use of scoring knives such as scoring knife 10A depicted in the right-hand portion of FIGURE 5.

In such copending application, the use of a wedge-shaped pressure plate or bar is taught, which bar is displaced by centrifugal force with operation of the cutter head to bear against the knife holder and thus fix the position of the cutting knife assembly during operation of the machine. The wedge-shaped bar 51 shown in FIGURE 5 of this application, however, has been modified in accordance with the inventive teaching to define a flake-collecting space therein. If angle iron 48 were not present, then the position of the outer surface of bar 51 (together with the edge of the cutting knife) would determine the thickness of the flakes produced. However, the extent of the radial movement of such bar as it bears against knife holder 46 to maintain the proper position for the cutting edge of knife 10 is not precisely adjustable; thus the exact radial distance between the cutting edge of knife 10 and the uppermost portion of bar 51 during the flaking operation will not be precisely determined. More specifically, if the width of the recess which receives pressure plate or bar 51 is made only slightly larger than the desired width, then the wedge-shaped bar will move farther from the center of the cutter head and the flakes produced will be too thin. Conversely, if the fit of wedge-shaped bar 51 within the recess is too tight, the bar will not move as far and flakes of excessive thickness will be produced. However, the maintenance of uniform flake size and quality is of prime importance in flaker machines.

According to another aspect of the present invention, angle iron 48 is inserted in the cutter head so that the outermost or transverse portion thereof is in effect an extension of the periphery of cutter head 1, to cooperate with the edges of the cutting knives in determining the thickness of the flakes produced. With the provision of the angle iron, the extent of movement of wedge-shaped bar 51 does not affect the thickness of the flakes produced, because the extension of the transverse portion of angle iron 48 is not changed by the movement of bar 51. Angle iron 48 is anchored or positively connected with the cutter head by extension of a lateral projection 52 from its radial arm into a corresponding recess in the cutter head, or by other equivalent connecting means. Thus, the tolerances of other parts does not affect the radial extension of the transverse arm of angle iron 48. The distance $p$, measured between the radial position of the edge of the cutting knife and the outer surface of the transverse arm of angle iron 48, is representative of the flake thickness.

Flake Removal

After flakes of a precise thickness and consistency have been produced, it is obviously desirable that the flakes should not be broken after they have been cut. Because the cut flakes are removed from disc-type flakers through the body of the disc, such flakers have frequently been preferred over cylinder-type flakers. This preference arises from the fact that the cylinder-type flakers have open flake grooves in front of the knives, and the cut flakes are thrown outwardly after the cutting; some of the flakes are thus caught between the knives and either damaged or destroyed. In accordance with the present invention, this disadvantage of prior art cylinder-type flakers has been obviated by forming a slit or entrance aperture 49 (FIGURE 5) defined by the cutting edge of knife 10 and the lip or cant of angle iron 48; after cutting, the flakes are forced through this aperture into the flake-collecting space 50, which is defined principally by a large central space in wedge-shaped bar 51.

The cut flakes are pushed or forced into the slit or entrance aperture 49 by the reaction to the cutting forces of the knives 10, and the flakes pass into the flake-collecting space. After the slit has passed the cutting zone, the flakes are thrown out of the collecting space 50 by centrifugal forces and conveyed through ducts 31 and 32 (FIGURE 1) to the collection area.

From the illustration of a portion of one segment of the cutter head in FIGURE 5, it is evident that the transverse portion of angle iron 48 provides a support for the wood during the cutting operation. Accordingly, the longer the transverse arm of angle iron 48 is made, the more support is provided for the wood during cutting. However, as additional support is thus provided for the cutting operation by elongating the transverse arm, the consequent narrowing of slit or aperture 49 may impede or prevent the proper ejection of the cut flakes from flake-collecting space 50 after the entrance aperture has passed through the cutting zone.

In accordance with another aspect of the invention, the additional force provided by a fluid under pressure may be added to the centrifugal forces of the cutter head in the radial direction to ensure that the flakes are properly ejected into the respective one of the ducts 31 or 32 after cutting. In FIGURE 6, a plurality of segments of a cutter head modified in conformity with this aspect of the invention are depicted. As there shown, shaft 53 of cutter head 1 includes a hollow central portion 53A and a pair of ducts or openings. Accordingly a fluid under pressure, such as compressed air, can be passed axially along the hollow central portion 53A and escape through the two openings into the area around the outside of shaft 53. Between such area and the bore of the cutter head a flow-directing means or collar 54 is interposed. A duct 55 connects each flake-collecting space 50 with the bore or interior of the cutter head adjacent collar 54. Collar 54 is stationary and comprises a pair of diametrically opposite projections positioned to prevent the entrance of the fluid under pressure into those ducts 55 which connect with the flake-collecting spaces adjacent cutting knives which are passing through the cutting zones. However, after the cutter head has rotated from the position shown in FIGURE 6 (collar 54 remaining stationary), those ducts 55 pass beyond such projections and are then effectively connected to pass the fluid under pressure. Thus, after the cutting process has been effected and the flake collected in one of the spaces 50, and after the cutter head has been displaced so that such flake-collecting space is now opposite one of the collection ducts 31 or 32, the respective duct 55 passes air under pressure in the radial direction into the flake-collecting space to augment the centrifugal force (which is also in the radial direction) in ejecting the flakes into the ducts 31 and 32. Thus, even though the entrance aperture 49 (FIGURE 5) is made smaller to provide better support for the wood during cutting, positive and safe removal of the flakes is assured by augmenting the centrifugal forces of the machine with the force from the fluid under pressure.

It has been found advantageous to incline the cutting knife assemblies to provide diagonal cuts of the wood. Each cutting knife assembly is inclined relative to the radial direction of the cutter head, as shown in FIGURE 1, and is also inclined relative to the axis of rotation of the cutter head, as illustrated in FIGURE 9. By suitably inclining the knives relative to the axis of the cutter head in relation to the width of slit or entrance aperture 49 and to the flake length in the direction of the wood fiber, the length of the cut flakes spans the slit in the direction of the axis of rotation of the cutter head.

If it is desired to provide even more support for the wood during the cutting or flaking operation, the width of the slit or entrance aperture 49 can be reduced even farther, to the point where the cut flakes can readily be forced into collecting space 50 but cannot be ejected therefrom after the cutting zone has been passed. When the entrance aperture 49 is made very small, then splinters, chunks, and other large bits of waste are prevented from entering the collecting space 50 and thus the reduced-entrance embodiment acts as a filter ensuring that only flakes of the desired size will enter the collecting areas. This reduced-width slit embodiment is depicted in FIGURES 7–9, in which the cutter head is modified in accordance with radial and axial fan principles to convey the cut flakes to the collecting areas.

As shown in FIGURES 7–9, air is sucked in at the front central area of the cutter head and enters channels 56. Covers 57 are provided to define the outer wall of channels 56, and to direct the air in the radial direction toward air deflectors 58 which extend inwardly as shown. Accordingly the air is deflected by elements 58 to pass through the flake-collecting spaces 50, carrying the cut flakes to the rear of the cutter head. A ring member 59 with fan blades 60 is affixed at the rear of the cutter head, to provide the desired air movement and carry the cut flakes away from the flake-collecting spaces.

To restrain the cut flakes against removal through entrance slit 49 and to prevent the cut flakes from becoming stuck in this slit, the cutter head comprises a pair of substantially semi-circular casings 61 which extend respectively above and below the cutter head between the two cutting zones. That is, the upper one of the casings extends from wood-supporting table 11 at the left cutting zone over the top of the cuter head to plate 22 at the righ cutting zone, and the lower casing extends from wood-supporting table 12 at the right cutting zone below the cutter head substantially to plate 21 at the left cutting zone. The inner surfaces of casings 61 include ribs inclined with respect to the knives to deflect any flakes stuck in the slits 49 out of the slits for passage through the flake-collecting spaces to the rear of the cutter head. Accordingly the fan-type cutter head depicted in FIGURES 7–9 provides a positive and safe means for drawing off the cut flakes without damage after they have been produced, while at the same time providing firm support during cutting by the transverse arm of angle iron 48.

It is again noted that the various components of the inventive system can be interchanged. That is, instead of maintaining the charging channels with the guide members (17 and 18) for the abutment bars stationary, they can be reciprocated with respect to the cutter head, wood-supporting tables, clamping levers and the other components which are described as movable in the illustrated embodiment. One or two charging channels can be provided, and wood of any length can be utilized in the charging channel by adding or removing extra conveyors at the end of those channels.

Although only particular embodiments of the invention have been shown and described, it is apparent that modifications and alterations may be made therein, and it is intended in the appended claims to cover all such modifications and alterations as may fall within the true spirit and scope of the invention.

What is claimed is:

1. A cutter head for a cylinder-type flaker comprising a plurality of segments, each segment including: a cutting knife having a cutting edge extending radially beyond the periphery of the cutter head; a wedge-shaped pressure bar defining a flake-collecting space adjacent the cutting knife; an angle iron including a radial portion and a transverse portion having a cant at the free edge thereof, the transverse portion being positioned substantially flush with the periphery of the cutter head to support the wood during the flaking operation, the cant of the angle iron and the cutting edge of the knife defining a slit at the entrance to the flake-collecting space, and the radial displacement between the cutting edge of the knife and the transverse portion of he angle iron determining the thickness of the flakes produced; and means for rotating the cutter head to cut flakes from wood positioned adjacent thereto, the flakes being pushed into the flake-collecting space by the reaction to the cutting forces and subsequently ejected from the flake-collecting space by centrifugal forces developed by rotation of the cutter head.

2. A cutter head according to claim 1 in which the radial portion of the angle iron includes means for locking the angle iron against radial displacement during rotation of the cutter head.

3. A cutter head for a cylinder-type flaker comprising a plurality of segments, each segment having a duct therein and including: a cutting knife having a cutting edge for applying cutting forces to wood presented adjacent thereto during the flaking operation; means positioned adjacent the cutting knife to define a flake-collecting space connected to said duct and an entrance aperture for such space, the flakes cut during the flaking operation being driven through the aperture into the flake-collecting space by the reaction to the cutting forces and subsequently urged outwardly from the flake-collecting space by the centrifugal forces developed during rotation of the cutter head; and means for passing a fluid under pressure through said duct into the flake-collecting space to augment the centrifugal forces in ejecting the flakes from the flake-collecting space.

4. A cutter head for a cylinder-type flaker which is rotated to apply cutting forces to wood positioned in a cutting zone adjacent thereto comprising a central chamber and a plurality of segments, each segment having a duct connected to said chamber and further including: a cutting knife having a cutting edge; means positioned adjacent the knife to define therewith a flake-collecting space connected to said duct and a slit adjacent the cutting edge of the knife at the entrance of such space; means for rotating the cutter head to apply cutting forces to the wood, the reaction to the cutting forces forcing the flakes into the flake-collecting space, and the centrifugal forces developed by rotation of the cutter head tending to eject the flakes from the flake-collecting space after the segment has passed the cutting zone; means for supplying fluid under pressure to said central chamber, the fluid passing through the duct and the flake-collecting space to augment the centrifugal force in ejecting the flakes from such space; and flow-directing means positioned adjacent the chamber for blocking the passage of the fluid under pressure as the cutting knife passes through the cutting zone and for permitting the passage of the fluid under pressure through the duct to force the flakes from the flake-collecting space after the cutting knife has passed through the cutting zone.

5. A cutter head for a cylinder-type flaker which is rotated to apply cutting forces to wood positioned in a cutting zone adjacent thereto comprising a central bore and a plurality of segments, each segment having a duct connected to said bore and further including: a cutting knife having a cutting edge; means including a wedge-shaped pressure bar positioned adjacent the knife to define a flake-collecting space connected to said duct; means comprising an angle iron positioned adjacent said bar to define with the cutting edge of the knife a slit at the entrance of the flake-collecting space; means for rotating the cutter head to apply cutting forces to the wood, the reaction to the cutting forces forcing the flakes into the flake-collecting space, and the centrifugal forces developed by rotation of the cutter head tending to eject the flakes from the flake-collecting space after the segment has passed through the cutting zone; means for supplying compressed air to said central bore, the air passing through the duct into the flake-collecting space to augment the centrifugal forces in ejecting the flakes from the space; and collar means positioned between the central bore and the duct, including a projection positioned to prevent the passage of compressed air to the duct as the cutting knife passes through the cutting zone and an open area to permit the passage of the compressed air through the duct to force the flakes from the flake-collecting space after the cutting knife has passed through the cutting zone.

6. A cutter head for a cylinder-type flaker disposed for rotation about a reference axis, having flake-collecting spaces, and front and rear faces disposed substantially perpendicular to said reference axis, said cutter head comprising: a plurality of air intakes positioned circumferentially about the front face of the cutter head; a plurality of air guidance channels, each channel extending between an intake at the front face and one of said flake-collecting spaces; and means including a plurality of fan-type blades affixed to the rear face of the cutter head, to draw air through the channels and flake-collecting spaces and thus remove the cut flakes from said spaces.

7. A cutter head for a cylinder-type flaker disposed for rotation about a reference axis, having a plurality of cutting knives and a flake-collecting space adjacent each knife, including front and rear faces disposed substantially perpendicular to said reference axis, said cutter head comprising: a plurality of air intakes positioned circumferentially about the front face of the cutter head; a plurality of air guidance channels, each channel extending from one of said intakes to one of said flake-collecting spaces; air deflection means positioned adjacent to the juncture of each of said channels with its respective flake-collecting space to direct the air from the channel into and through the flake-collecting space; means including a ring member and a plurality of fan-type blades affixed at the rear face of the cutter head to draw air through said intakes, channels, and flake-collecting spaces for removing the cut flakes from the flake-collecting spaces; and a pair of housing means respectively disposed above and below said cutter head, including a plurality of ribs on the inner surfaces thereof to deflect cut flakes into the flake-collecting spaces for removal by the passage of air through said spaces.

References Cited in the file of this patent

UNITED STATES PATENTS

| | | |
|---|---|---|
| 351,285 | Ritchie | Oct. 19, 1886 |
| 1,611,298 | Wilderson | Dec. 21, 1926 |
| 2,727,542 | Fischer | Dec. 20, 1955 |
| 2,739,627 | Vohringer | Mar. 27, 1956 |
| 2,811,183 | Mottet | Oct. 29, 1957 |
| 2,825,371 | Forman | Mar. 4, 1958 |
| 2,836,206 | Gaskell | May 27, 1958 |
| 2,849,038 | Clark | Aug. 26, 1958 |
| 2,917,091 | Smith et al. | Dec. 15, 1959 |
| 2,951,518 | Cumpston | Sept. 6, 1960 |

FOREIGN PATENTS

| | | |
|---|---|---|
| 335,229 | Switzerland | Feb. 14, 1959 |
| 1,111,800 | Germany | July 27, 1961 |